(12) United States Patent
Jo

(10) Patent No.: US 9,956,824 B2
(45) Date of Patent: May 1, 2018

(54) MOTORCYCLE TIRE

(71) Applicant: Sumitomo Rubber Industries, Ltd., Kobe-shi, Hyogo (JP)

(72) Inventor: Hiroshi Jo, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 113 days.

(21) Appl. No.: 15/058,678

(22) Filed: Mar. 2, 2016

(65) Prior Publication Data
US 2016/0272009 A1 Sep. 22, 2016

(30) Foreign Application Priority Data

Mar. 18, 2015 (JP) ................. 2015-054317

(51) Int. Cl.
*B60C 11/03* (2006.01)
*B60C 11/00* (2006.01)
*B60C 11/13* (2006.01)

(52) U.S. Cl.
CPC ...... *B60C 11/0083* (2013.01); *B60C 11/0302* (2013.01); *B60C 11/032* (2013.01);
(Continued)

(58) Field of Classification Search
CPC ... B60C 11/03; B60C 11/0302; B60C 11/032; B60C 11/033; B60C 11/0332;
(Continued)

(56) References Cited

U.S. PATENT DOCUMENTS

D302,413 S * 7/1989 Buck ............................ D12/535
D490,358 S * 5/2004 Taniguchi .................... D12/534
(Continued)

FOREIGN PATENT DOCUMENTS

CN 203293822 U 11/2013
DE 3411667 * 11/1984
(Continued)

OTHER PUBLICATIONS

DE 3411667, Nov. 1984, English language machine translation.*
(Continued)

*Primary Examiner* — Eric Hug
(74) *Attorney, Agent, or Firm* — Birch, Stewart, Kolasch & Birch, LLP

(57) ABSTRACT

A motorcycle tire includes a tread portion including a central region and a pair of shoulder regions. In a cross-sectional view of the tire under a standard condition, the central region has an outer profile protruding radially outwardly and having a first radius of curvature R1, and each shoulder region having an outer profile protruding radially outwardly and having a second radius of curvature R2 smaller than the first radius of curvature R1. The tread portion is provided with a zigzag central main groove in the central region with zigzag corners, a plurality of shoulder lateral grooves each extending axially outwardly from each zigzag corner to one of the shoulder regions, and a plurality of shoulder sub groove each disposed between a pair of circumferentially adjacent shoulder lateral grooves and each extending axially outwardly from the central region to the shoulder region.

12 Claims, 2 Drawing Sheets

(52) U.S. Cl.
CPC ... *B60C 11/1353* (2013.01); *B60C 2011/0346* (2013.01); *B60C 2011/0358* (2013.01); *B60C 2011/0374* (2013.01); *B60C 2200/10* (2013.01)

(58) Field of Classification Search
CPC ......... B60C 11/0083; B60C 2011/0341; B60C 2011/0344; B60C 2011/0346; B60C 2011/0358; B60C 2011/0372; B60C 2011/0374; B60C 2011/0381; B60C 2011/0383; B60C 2200/10
USPC .................................... 162/209.11; D12/534
See application file for complete search history.

(56) References Cited

U.S. PATENT DOCUMENTS

| | | | | |
|---|---|---|---|---|
| D506,970 S | * | 7/2005 | Jackson | D12/534 |
| D522,447 S | * | 6/2006 | Matsunami | D12/535 |
| D523,391 S | * | 6/2006 | Matsunami | D12/535 |
| D531,569 S | * | 11/2006 | Steinbach | D12/535 |
| D601,942 S | * | 10/2009 | Bell | D12/535 |
| 2006/0219342 A1 | * | 10/2006 | Steinbach | B60C 11/0302 152/209.11 |

FOREIGN PATENT DOCUMENTS

| | | | |
|---|---|---|---|
| JP | 5-310009 | * | 11/1993 |
| JP | 10-193912 | * | 7/1998 |
| JP | 2002-36812 A | | 2/2002 |
| JP | 2007-506590 A | | 3/2007 |

OTHER PUBLICATIONS

Siahaan, "EICMA 2013: 2014 Honda CTX1300 First Impressions—Video," Nov. 5, 2013, XP002759790, pp. 1-2, http://blog.motorcycle.com/2013/11/05/motorcycle-news/eicma-2013-2014-honda-ctx1300-first-impressions-video/.

* cited by examiner

MOTORCYCLE TIRE

BACKGROUND ART

Field of the Invention

The present invention relates to motorcycle tires, and in particular relates to a motorcycle tire that may improve straight-traveling stability as well as transient characteristic of cornering.

Description of the Related Art

Conventionally, a motorcycle tire including a tread portion provided with a groove has been proposed. Upon wet road traveling, the groove provided on the tread portion may disperse the water outward from under the tread portion to improve wet grip performance. On the other hand, the groove changes rigidity of the tread portion and therefore it may influence handling performance of the tire.

Japanese Unexamined Patent Application Publication (Translation of PCT Application) No. 2007-506590 discloses a motorcycle tire having an improved groove arrangement that includes a zigzag central main groove disposed in a central region, a plurality of shoulder lateral grooves each extending from the central main groove and a plurality of shoulder sub grooves each extending along the shoulder lateral grooves to improve wet grip performance.

Unfortunately, the above mentioned motorcycle tire includes a tread portion formed as a curved manner with a small radius of curvature. Since the motorcycle tire has insufficient ground contact area during straight traveling, grip during straight traveling may not be enough. As a result, the motorcycle tire disclosed by the above mentioned Patent Publication has had a problem with respect to straight traveling stability.

Meanwhile, when the outer profile of the tread portion is formed as a large radius of curvature, the wet grip performance may be deteriorated. Furthermore, in the tire including a tread portion having a large radius of curvature, a gap between the normal of the tread outer surface and the normal on the ground becomes large when a large camber angle is given. Such a tire tends to exhibit the transient characteristic that suddenly changes when the camber angle becomes large. Accordingly, there was room for improvement on the straight traveling stability and transient characteristic while maintaining wet grip performance.

SUMMARY OF THE INVENTION

In view of the above problems in the conventional art, the present invention has an object to provide a motorcycle tire that may improve straight traveling stability as well as transient characteristic of cornering.

According to the present invention, a motorcycle tire includes a tread portion including a central region and a pair of shoulder regions. In a cross-sectional view of the tire under a standard condition in which the tire is mounted on a standard rim with a standard pressure but is loaded with no tire load, the central region has an outer profile protruding radially outwardly and having a first radius of curvature R1, and each shoulder region having an outer profile protruding radially outwardly and having a second radius of curvature R2 smaller than the first radius of curvature R1. The tread portion is provided with a circumferentially and continuously extending zigzag central main groove in the central region and including a plurality of zigzag corners, a plurality of shoulder lateral grooves each extending axially outwardly from each zigzag corner of the central main groove to one of the shoulder regions, and a plurality of shoulder sub groove each disposed between a pair of circumferentially adjacent shoulder lateral grooves and each extending axially outwardly from the central region to the shoulder region.

In another aspect of the invention, a ratio R2/R1 of the second radius of curvature R2 to the first radius of curvature R1 may be in a range of not less than 0.67 and less than 1.00.

In another aspect of the invention, the central region may have a center corresponding to a tire equator and a width in a range of from 50% to 70% of a tread development width.

In another aspect of the invention, a distance from each zigzag corner of the central main groove to a tire equator measured along an outer surface of the tread portion may be in a range of from 5% to 10% of a tread development width.

In another aspect of the invention, the central main groove may include a first inclined portion and a second inclined portion which are joined at each zigzag corner wherein the second inclined portion is inclined in an opposite direction to the first inclined portion, and each of the first inclined portion and the second inclined portion may be inclined at an angle of from 10 to 30 degrees with respect to a circumferential direction of the tire.

In another aspect of the invention, the shoulder lateral grooves may include a first shoulder lateral groove having a continuous inclination to the first inclined portion and a second shoulder lateral groove having a continuous inclination to the second inclined portion.

In another aspect of the invention, the shoulder sub grooves may include a first shoulder sub groove extending along the first shoulder lateral groove and a second shoulder sub groove extending along the second shoulder lateral groove.

In another aspect of the invention, each of the shoulder lateral grooves and the shoulder sub grooves may include an axially outer end portion that is bent axially inwardly.

In another aspect of the invention, a distance of each shoulder sub grooves extending in the central region measured along an outer surface of the tread portion may be in a range of not more than 15% of a tread development width.

In another aspect of the invention, each of the shoulder sub grooves may include a depth-change portion in which a depth changes on the side of an axially inner end portion, and at least a part of the depth-change portion may be provided within the central region.

DESCRIPTION OF THE PREFERRED EMBODIMENTS

An embodiment of the present invention will be explained below with reference to the accompanying drawings.

Figure 1:
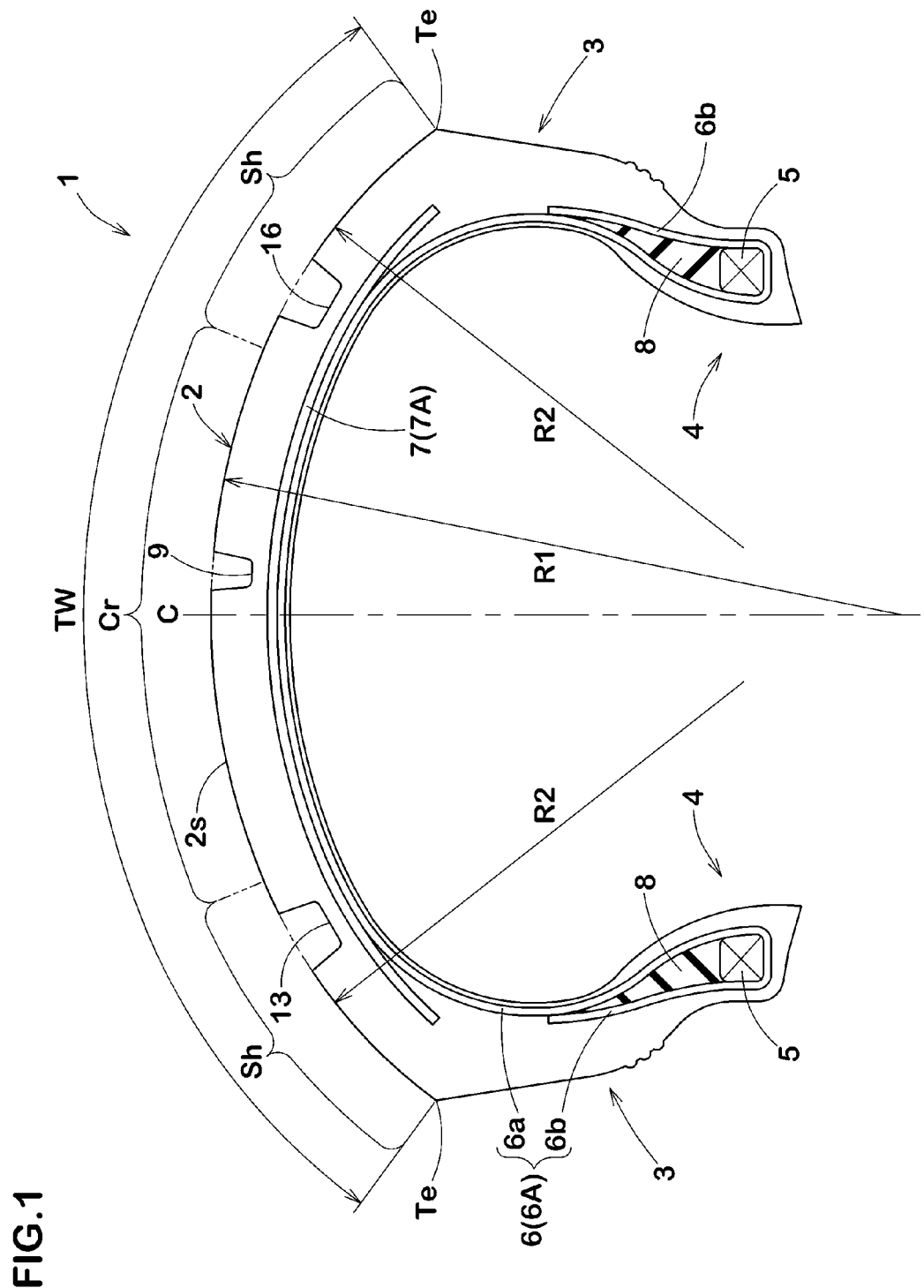
FIG. 1 is a cross-sectional view of a motorcycle tire according to an embodiment of the present invention.
Figure 2:
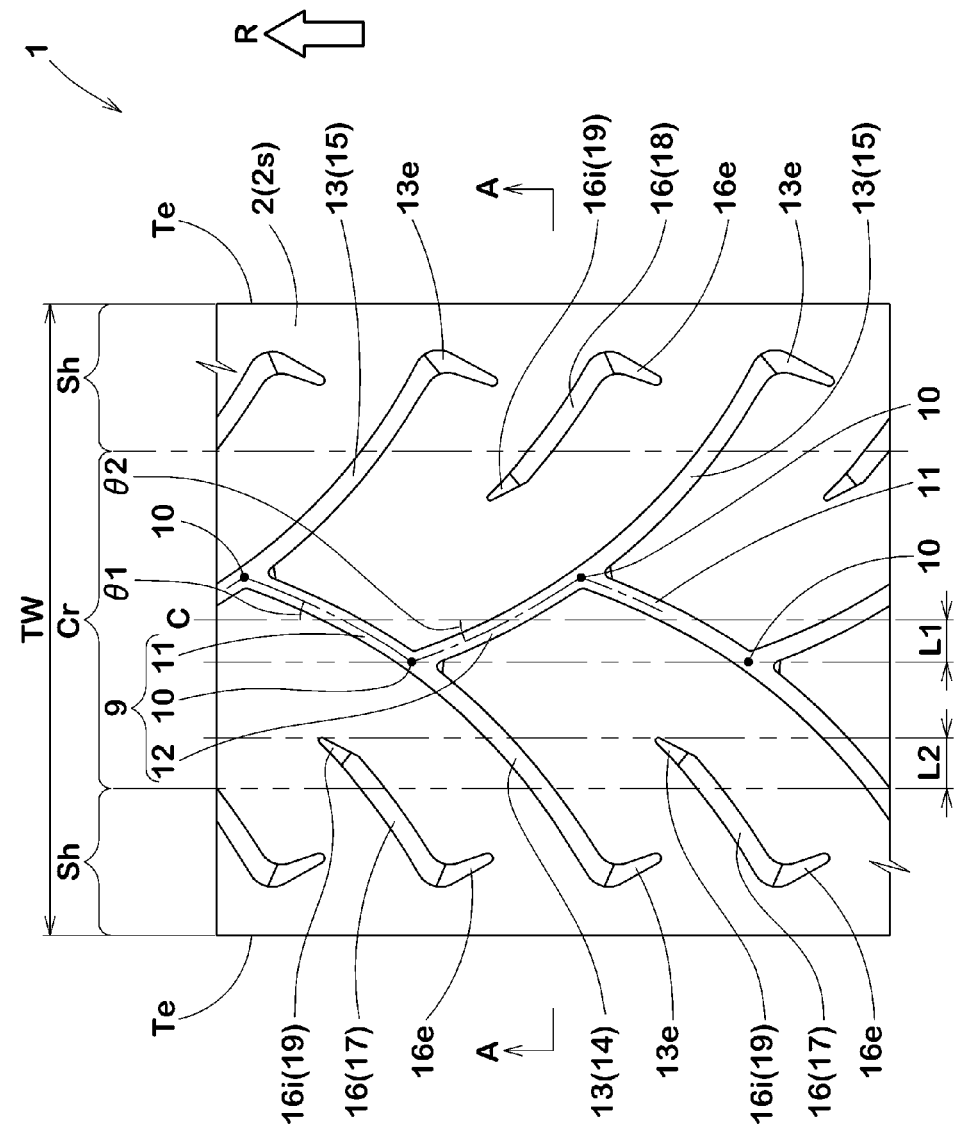
FIG. 2 is a development view of a tread pattern of the tread portion illustrated in FIG. 1.

FIG. 1 illustrates a cross-sectional view of a motorcycle tire 1 in accordance with a preferred embodiment of the invention. The tire 1 is placed under a standard condition. FIG. 2 illustrates a tread pattern of the tread portion 2 of the tire 1. Here, FIG. 1 is a cross-section taken along lines A-A of FIG. 2.

The standard condition is such that the tire 1 is mounted on a standard wheel rim (not shown) with a standard pressure but is loaded with no tire load. In this description, unless otherwise noted, dimensions of respective portions of the tire are values specified in the standard condition.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 in accordance with the present embodiment includes a carcass 6 and a band layer 7 disposed radially outward of the carcass 6 in the tread portion 2.

The carcass 6, for example, includes at least one carcass ply 6A of carcass cords oriented at an angle of 75 to 90 degrees with respect to the tire equator C. As the carcass cords, an organic fiber cord such as nylon, polyester and rayon may be employed, for example.

The carcass ply 6A, for example, includes a toroidal main body 6a extending between the bead cores 5 and a pair of turn-up portions 6b each turned up around each bead core 5 from the axially inside to the outside of the tire. In each bead portion 4, a radially tapering bead apex rubber 8 which extends from the bead core 5 and made of a hard rubber is disposed between the main portion 6a and the turn-up portion 6b.

The band layer 7, for example, includes at least one band ply 7A of band cords. The band layer 9 is formed as a full-band ply that covers the substantially entire tread width so as to restrain the movement of the tread portion 2 in order to improve cornering performance as well as high speed traveling performance. In this embodiment, the band ply 7A includes the band cords oriented at an angle of not more than 5 degrees with respect to the circumferential direction of the tire. As the band cords, an organic fiber cord such as aramid and rayon may be employed, for example.

In this embodiment, the tread portion 2 of the tire 1 includes a central region Cr having a center corresponding to the tire equator C and a pair of shoulder regions Sh located axially outward of the central region Cr. Preferably, the central region Cr is a region having a width in a range of from 50% to 70% of a tread development width TW. As used herein, the tread development width TW is a distance between tread edges Te and Te measured along an outer surface 2s of the tread portion 2.

The tread portion 2 is curved as a whole so that the outer surface 2s of the tread portion 2 protrudes radially outwardly in an arc manner. The central region Cr has an outer profile protruding radially outwardly and having a first radius of curvature R1. In this embodiment, the first radius of curvature R1, for example, is a single radius. Each shoulder region Sh has an outer profile protruding radially outwardly and having a second radius of curvature R2. In this embodiment, the second radius of curvature R2, for example, is a single radius. The outer profile of the central region Cr is smoothly connected and continued to the outer profile of the shoulder region Sh.

In this embodiment, the second radius of curvature R2 of the shoulder region Sh is set smaller than the first radius of curvature R1 of the central region Cr. Thus, the central region Cr may offer a large ground contact area to improve grip performance during straight traveling. Furthermore, since the central region Cr offers a large ground contact area even during cornering with a small camber angle, the change of handling-performance according to change of camber angle can also be suppressed. Accordingly, transient characteristic of the tire during cornering with a small camber angle can be moderated so that straight traveling performance of the tire improves. Meanwhile, the difference between the normal of the outer profile of the shoulder region Sh and the normal of the ground tends to be small when cornering at a large camber angle. Accordingly, transient characteristic of the tire during cornering with a large camber angle can also be moderated so that cornering performance of the tire improves.

Preferably, a ratio R2/R1 of the second radius of curvature R2 to the first radius of curvature R1 is in a range of not less than 0.67 and less than 1.00. When the ratio R2/R1 is less than 0.67, the transient characteristic in which the ground contact area moves from the central region Cr to the shoulder region Sh tends to deteriorate. When the ratio R2/R1 is equal to or more than 1.00, it may be difficult to improve straight traveling stability and transient characteristics of cornering in well balanced manner. Preferably, the ratio R2/R1 is set in a range of from 0.7 to 0.8.

As illustrated in FIG. 2, the tread pattern of the tire 1 in accordance with the present embodiment has a designated rotational direction R in order to maximize the performance thereof. The rotational direction R may be indicated on the sidewall portion 3 (illustrated in FIG. 1).

The tread portion 2 is provided with a circumferentially and continuously extending zigzag central main groove 9 in the central region Cr. In this embodiment, the central main groove 9 extends on the tire equator C. The central main groove 9 includes a plurality of zigzag corners 10 which are defined using a groove centerline. Preferably, a distance L1 from each zigzag corner 10 of the central main groove 9 to the tire equator C measured along the outer surface 2s of the tread portion 2 is in a range of from 5% to 10% of the tread development width TW. Each of the zigzag corners 10 of the central main groove 9 may come into contact with the ground when straight traveling ahead, and therefore an excellent wet grip performance can be ensured. Accordingly, even when the central region Cr is defined as a large first radius of curvature R1, the wet grip performance can be maintained.

The central main groove 9 includes a first inclined portion 11 inclined in an inclination at a first angle θ1 and a second inclined portion 12 inclined in an opposite direction to the first inclined portion 11 with a second angle θ2. The first inclined portion 11 and the second inclined portion 12 are joined at each zigzag corner 10. Preferably, the first angle θ1 and the second angle θ2 of the first inclined portion 11 and the second inclined portion 12 respectively are in a range of from 10 to 30 degrees with respect to the circumferential direction of the tire. In this embodiment, the first angle θ1 and the second angle θ2 are the same. Alternatively, the first angle θ1 may be different from the second angle θ2.

In this embodiment, the tread portion 2 is provided with a plurality of shoulder lateral grooves 13 each extending axially outwardly from each zigzag corner 10 to the shoulder region Sh toward backwardly in the rotational direction R of the tire. Such a shoulder lateral groove 13 may disperse water from the central main groove 9 toward the outside of the tire. As a result, an excellent drainage performance can be obtained. Furthermore, the shoulder lateral grooves 13, for example, may mitigate rigidity of the shoulder region Sh, and therefore grip performance on cornering at a large camber angle can be improved.

Preferably, the shoulder lateral grooves 13 include a first shoulder lateral groove 14 having a continuous inclination to the first inclined portion 11 and a second shoulder lateral groove 15 having a continuous inclination to the second inclined portion 12. The first shoulder lateral groove 14 is arranged in an opposite side to the tire equator C with respect to the second shoulder lateral groove 15, and which are arranged alternately in the circumferential direction of the tire.

Each of the shoulder lateral grooves 13 includes an axially outer end portion 13e that is bent axially inwardly. Such an outer end portion 13e may further mitigate rigidity of the shoulder region Sh in order to improve grip performance on cornering at a large camber angle. Furthermore, the outer end portion 13e preferably has a depth which decreases axially inwardly. The outer end portion 13e, for example, may change transient characteristic on cornering smoothly.

A shoulder sub groove 16 is provided between a pair of circumferentially adjacent shoulder lateral grooves 13. In this embodiment, one shoulder sub groove 16, for example, is disposed in each location between a pair of circumferentially adjacent shoulder lateral grooves 13. Preferably, the shoulder sub groove 16 extends axially outwardly and backward in the rotational direction R across not only the central region Cr but also the shoulder region Sh. The shoulder sub groove 16 may mitigate rigidity of the shoulder region Sh moderately to improve grip performance on cornering at a large camber angle.

The shoulder sub grooves 16 include a first shoulder sub groove 17 extending along the first shoulder lateral groove 14 and a second shoulder sub groove 18 extending along the second shoulder lateral groove 15. The first shoulder sub groove 17 is arranged in an opposite side to the tire equator C with respect to the second shoulder sub groove 18, and which are arranged alternately in the circumferential direction of the tire.

Each of the shoulder sub grooves 16 includes an axially outer end portion 16e that is bent axially inwardly. Such an outer end portion 16e may further mitigate rigidity of the shoulder region Sh in order to improve grip performance on cornering at a large camber angle. Furthermore, the outer end portion 16e preferably has a depth which decreases axially inwardly. The outer end portion 16e, for example, may change transient characteristic on cornering smoothly.

Each of the shoulder sub grooves 16 includes an axially inner end portion 16i located in the central region Cr. Preferably, a distance L2 of each shoulder sub grooves 16 extending in the central region Cr measured along the outer surface 2s of the tread portion 2 is in a range of not more than 15% of the tread development width TW. When the distance L2 is more than 15% the tread development width TW, rigidity of the central region Cr tends to be insufficient, thereby deteriorating straight traveling stability. Preferably, the distance L2 is not more than 10% the tread development width TW.

Preferably, an entire depth-change portion 19 of the shoulder sub groove 16 is included in the inner end portion 16i. The depth-change portion 19 has a depth gradually decreasing toward the tire equator C. The depth-change portion 19 extends within the central region Cr at least partially. The depth-change portion 19, for example, may change rigidity of the central region smoothly, thereby improving transient characteristic in cornering.

Preferably, the depth-change portion 19 is located within the central region Cr as a whole. The shoulder sub groove 16 having such a depth-change portion 19 does not change the groove cross-sectional area around the boundary between the central region Cr and the shoulder region Sh. Thus, the transient characteristic across the boundary between the central region Cr and the shoulder region Sh can also be improved.

While the embodiments in accordance with the present invention have been described in detail, the present invention is not limited to the illustrated embodiments, but can be modified and carried out in various aspects.

Example

Motorcycle tires having a tread pattern illustrated in FIG. 2 and an internal structure illustrated in FIG. 1 were manufactured based on details shown in Table 1. Then, each test tire was installed to a rear wheel of a test motorcycle. Then, wet grip performance, straight traveling performance and transient characteristic on cornering of each test tire were tested on a circuit course. The common specifications of tires and test procedures are as follows.

Test motorcycle: Large-sized motorcycle with displacement of 1,300 cc
Rear tire size: 200/50R18
Rear tire inner pressure: 290 kPa
Wet Grip Performance Test:

A test rider rode the test motorcycle on a wet circuit course, and evaluated wet grip performance by his feeling. The wet grip performance was evaluated in terms of drainage performance on straight traveling and drainage performance on cornering. The results are indicated using a score of Ref. 1 being 100. The larger the value, the better the performance is.

Straight Traveling Performance Test:

A test rider rode the test motorcycle on a dry circuit course, and evaluated straight traveling performance by his feeling. The straight traveling performance was evaluated at both high and low speed conditions. The results are indicated using a score of Ref. 1 being 100. The larger the value, the better the performance is.

Transient Characteristic on Cornering:

A test rider rode the test motorcycle on a dry circuit course, and evaluated the transient characteristic on cornering by his feeling. The transient characteristic on cornering was evaluated as degree of smoothness of the grounding property change of the test motorcycle while changing the camber angle. The results are indicated using a score of Ref. 1 being 100. The larger the value, the better the performance is.

The test results are shown in Table 1. From the test results, it has been confirmed that the example tires improve straight traveling stability as well as transient characteristic on cornering, as compared with the reference tires.

TABLE 1

|  | Ref. 1 | Ref. 2 | Ref. 3 | Ex. 1 | Ex. 2 | Ex. 3 | Ex. 4 | Ex. 5 | Ex. 6 |
| --- | --- | --- | --- | --- | --- | --- | --- | --- | --- |
| First radius of curvature R1 (mm) | 120 | 105 | 140 | 140 | 150 | 125 | 140 | 140 | 140 |
| Second radius of curvature R2 (mm) | 120 | 140 | 105 | 105 | 95 | 120 | 105 | 105 | 105 |
| Tread development width TW(mm) | 235 | 230 | 230 | 230 | 225 | 235 | 230 | 230 | 230 |

TABLE 1-continued

|  | Ref. 1 | Ref. 2 | Ref. 3 | Ex. 1 | Ex. 2 | Ex. 3 | Ex. 4 | Ex. 5 | Ex. 6 |
| --- | --- | --- | --- | --- | --- | --- | --- | --- | --- |
| Distance L1(mm) | 20 | 20 | 20 | 20 | 20 | 20 | 10 | 40 | 20 |
| Distance L2 (mm) | 20 | 20 | 0 | 20 | 20 | 20 | 20 | 20 | 40 |
| Wet grip performance (Score) | 100 | 100 | 90 | 100 | 95 | 100 | 95 | 110 | 105 |
| Straight traveling performance (Score) | 100 | 90 | 120 | 120 | 125 | 105 | 125 | 105 | 110 |
| Transient characteristic on cornering (Score) | 100 | 90 | 90 | 120 | 105 | 105 | 115 | 120 | 120 |

What is claimed is:

1. A motorcycle tire comprising:
a tread portion comprising a central region and a pair of shoulder regions;
in a cross-sectional view of the tire under a standard condition in which the tire is mounted on a standard rim with a standard pressure but is loaded with no tire load, the central region has an outer profile protruding radially outwardly and having a first radius of curvature R1, and each shoulder region having an outer profile protruding radially outwardly and having a second radius of curvature R2 smaller than the first radius of curvature R1, wherein a ratio R2/R1 of the second radius of curvature R2 to the first radius of curvature R1 is in a range of not less than 0.67 and less than 1.00; and
the tread portion being provided with a circumferentially and continuously extending zigzag central main groove in the central region and comprising a plurality of zigzag corners, a plurality of shoulder lateral grooves each extending axially outwardly from each zigzag corner of the central main groove to one of the shoulder regions, and a plurality of shoulder sub groove each disposed between a pair of circumferentially adjacent shoulder lateral grooves and each extending axially outwardly from the central region to the shoulder region.

2. The motorcycle tire according to claim 1,
wherein the central region has a center corresponding to a tire equator and a width in a range of from 50% to 70% of a tread development width.

3. The motorcycle tire according to claim 1,
wherein a distance from each zigzag corner of the central main groove to a tire equator measured along an outer surface of the tread portion is in a range of from 5% to 10% of a tread development width.

4. The motorcycle tire according to claim 1,
wherein the central main groove comprises a first inclined portion and a second inclined portion which are joined at each zigzag corner wherein the second inclined portion is inclined in an opposite direction to the first inclined portion, and each of the first inclined portion and the second inclined portion is inclined at an angle of from 10 to 30 degrees with respect to a circumferential direction of the tire.

5. The motorcycle tire according to claim 4,
wherein the shoulder lateral grooves comprise a first shoulder lateral groove having a continuous inclination to the first inclined portion and a second shoulder lateral groove having a continuous inclination to the second inclined portion.

6. The motorcycle tire according to claim 5,
wherein the shoulder sub grooves comprise a first shoulder sub groove extending along the first shoulder lateral groove and a second shoulder sub groove extending along the second shoulder lateral groove.

7. The motorcycle tire according to claim 6,
wherein each of the shoulder lateral grooves and the shoulder sub grooves comprises an axially outer end portion that is bent axially inwardly.

8. The motorcycle tire according to claim 1,
wherein a distance of each shoulder sub grooves extending in the central region measured along an outer surface of the tread portion is in a range of not more than 15% of a tread development width.

9. The motorcycle tire according to claim 1,
wherein each of the shoulder sub grooves comprises a depth-change portion in which a depth changes on the side of an axially inner end portion, and at least a part of the depth-change portion is provided within the central region.

10. A motorcycle tire comprising:
a tread portion comprising a central region and a pair of shoulder regions;
in a cross-sectional view of the tire under a standard condition in which the tire is mounted on a standard rim with a standard pressure but is loaded with no tire load, the central region has an outer profile protruding radially outwardly and having a first radius of curvature R1, and each shoulder region having an outer profile protruding radially outwardly and having a second radius of curvature R2 smaller than the first radius of curvature R1; and
the tread portion being provided with a circumferentially and continuously extending zigzag central main groove in the central region and comprising a plurality of zigzag corners, a plurality of shoulder lateral grooves each extending axially outwardly from each zigzag corner of the central main groove to one of the shoulder regions, and a plurality of shoulder sub grooves each disposed between a pair of circumferentially adjacent shoulder lateral grooves and each extending axially outwardly from the central region to the shoulder region, wherein each of the shoulder sub grooves comprises an axially outer end portion that is bent axially inwardly.

11. The motorcycle tire according to claim 10,
wherein each of the shoulder lateral grooves comprises an axially outer end portion that is bent axially inwardly.

12. A motorcycle tire comprising:
a tread portion comprising a central region and a pair of shoulder regions;
in a cross-sectional view of the tire under a standard condition in which the tire is mounted on a standard rim with a standard pressure but is loaded with no tire load, the central region has an outer profile protruding radially outwardly and having a first radius of curvature R1, and each shoulder region having an outer profile protruding radially outwardly and having a second radius of curvature R2 smaller than the first radius of curvature R1; and
the tread portion being provided with a circumferentially and continuously extending zigzag central main groove in the central region and comprising a plurality of zigzag corners, a plurality of shoulder lateral grooves each extending axially outwardly from each zigzag corner of the central main groove to one of the shoulder regions, and a plurality of shoulder sub grooves each disposed between a pair of circumferentially adjacent shoulder lateral grooves and each extending axially outwardly from the central region to the shoulder region, wherein each of the shoulder sub grooves comprises a depth-change portion in which a depth changes on the side of an axially inner end portion, and at least a part of the depth-change portion is provided within the central region.

\* \* \* \* \*